E. A. BYRNES.
PROCESS OF EFFECTING REDUCTION AND PRODUCING FERROSILICON.
APPLICATION FILED JUNE 26, 1907.
1,051,194.
Patented Jan. 21, 1913.
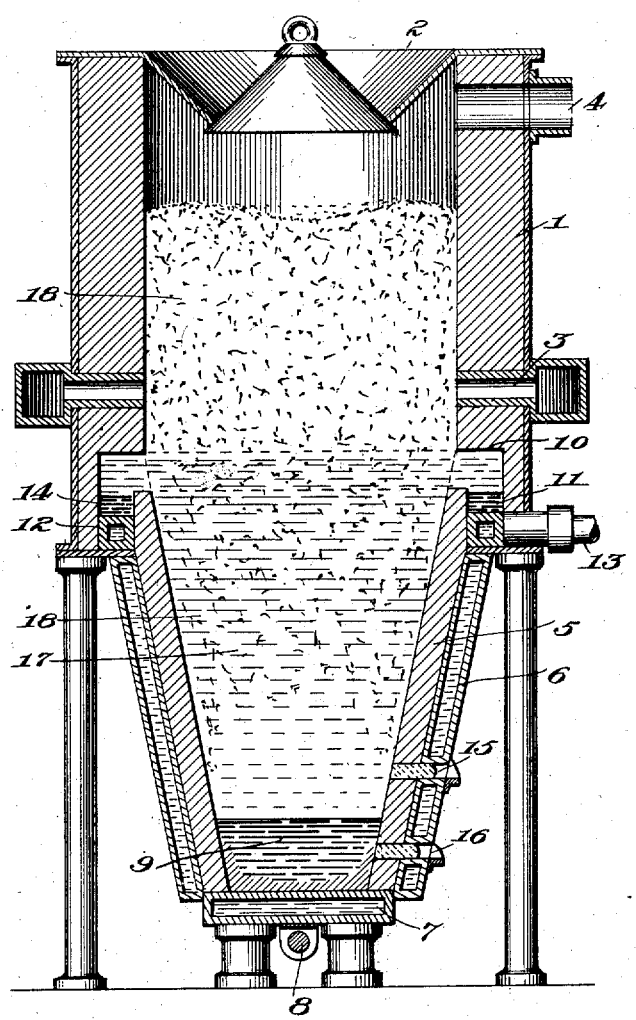
Witnesses:
Inventor:
Eugene A. Byrnes,
by Byrnes & Townsend,
Att'ys.

UNITED STATES PATENT OFFICE.

EUGENE A. BYRNES, OF WASHINGTON, DISTRICT OF COLUMBIA, ASSIGNOR TO ELECTRO METALLURGICAL COMPANY, OF CHICAGO, ILLINOIS, A CORPORATION OF WEST VIRGINIA.

PROCESS OF EFFECTING REDUCTION AND PRODUCING FERROSILICON.

1,051,194.     Specification of Letters Patent.     Patented Jan. 21, 1913.

Application filed June 26, 1907. Serial No. 380,934.

*To all whom it may concern:*

Be it known that I, EUGENE A. BYRNES, a citizen of the United States, residing at Washington, in the District of Columbia, have invented certain new and useful Improvements in Processes of Effecting Reduction and Producing Ferrosilicon, of which the following is a specification.

According to this process, refractory metal-bearing ores and compounds, specifically a charge consisting of a silicon compound, a source of iron and coal for the production of ferrosilicon, are reduced by submerging the lower portion of the charge in a vertical molten resistor-column, preheating the unsubmerged upper portion by passing air and hot products of combustion upward through it, and heating the submerged lower portion by passing through the molten resistor an electric current of energy-density increasing downward toward the zone of reduction. The electric terminals are preferably of molten ferrosilicon, one being a ring surrounding the upper end of the resistor-column and the other a body of the metallic product beneath the lower end of this column. As reduction proceeds the excess slag and metal are tapped out and additions are made to the charge.

A suitable stack furnace is shown in the accompanying drawing, in which the figure is a vertical central section. This furnace comprises a preheating chamber 1 having at its upper end a bell-and-hopper charging mechanism 2. Radial air-inlets 3 open into its lower end and an outlet 4 for waste gases extends through the side. Beneath the preheater is the electric heater, comprising a downwardly-converging bosh 5 surrounded by a water-jacket 6, and a water-cooled metal hearth 7 having an electric connection 8. Supported on this hearth is a body 9 of molten metal, specifically ferrosilicon, constituting one electric terminal. At the upper end of the bosh 5 is a horizontal annular recess 10, opening into a depending annular recess 11 which is closed at its lower end by a water-cooled metal ring 12 having an electric connection 13. Supported on this ring is an annular body 14 of molten metal, specifically ferrosilicon, constituting the other electric terminal. Superposed tap-holes 15, 16 for slag and metal respectively extend laterally through the bosh 5. Supported in this bosh is a vertical resistor-column 17, specifically of a silicate slag, extending at its upper end into the recesses 10, 11, in contact with the molten electric terminal 14, and resting at its lower end upon the molten electric terminal 9.

In using this furnace to carry out the process, the charge-body 18, consisting for example of a mixture of silica, iron ore and an excess of coal, extends downward into the molten resistor 18 and upward into the preheater 1. Air is supplied by the twyers 3, in amount sufficient to burn the excess coal in the charge. The charge is thereby preheated, the waste products escaping at the top. An electric current is passed through the molten resistor 17 between the molten-metal terminals, the energy-density of this current increasing downward by reason of the convergence of the bosh. The charge is thereby progressively heated to the temperature of reduction, the zone of reduction occupying the lower portion of the molten resistor. The reduced metal or metals subside and unite with the metal-body 9 and the slag unites with the slag-body 17. As reduction proceeds the excess metal and slag are tapped out and fresh charge-mixture is added at the top.

Other combustibles and reducing-agents than coal may be employed, but if the desired product is ferrosilicon, the silicon, iron and aluminum reduced from the coal-ashes may be unobjectionable. The preheating may be effected by hot gases supplied through the twyers.

I claim:

1. The process of heating a porous or granular body, which consists in permeating one portion of said body with a hot gas and another substantial portion with a hot liquid.

2. The process of heating a porous or granular body, which consists in permeating one portion of said body with hot gases and another substantial portion with an electrically-heated liquid.

3. The process of heating a vertical column of granular material, which consists in passing hot gases through the upper portion of said column and electrically heating a liquid submerging a substantial lower portion of said column.

4. The process of heating a vertical column of granular materials, which consists in passing hot gases upward through the upper portion of said column and passing an electric current of downwardly-increasing energy-density through a liquid submerging a substantial lower portion of said column.

5. The process of reducing a granular charge, which consists in disposing said charge in a vertical column with a substantial lower portion submerged in a molten liquid, passing hot products of combustion through the upper portion of said column, and electrically heating said liquid.

6. The process of reducing a granular charge, which consists in disposing said charge in a vertical column with a substantial lower portion submerged in a molten liquid, passing hot products of combustion through the upper portion of said column, electrically heating said liquid, withdrawing the reduction-products, and supplying additional charge-materials to the upper end of said column as it gravitates downward.

7. The process of effecting reduction, which consists in partially submerging a substantial portion of the charge in a molten resistor, directly heating the unsubmerged portion by products of combustion from an external source, and heating the submerged portion by passing an electric current through said resistor.

8. The process of effecting reduction, which consists in partially submerging a substantial portion of the charge in a molten resistor, directly heating the unsubmerged portion by products of combustion from an external source, and heating the submerged portion by passing an electric current of increasing energy-density through said resistor.

9. The process of effecting reduction, which consists in partially submerging a substantial portion of the charge in a molten resistor, directly heating the unsubmerged portion by products of combustion from an external source, heating the submerged portion by passing an electric current through said resistor, removing the excess slag and reduced metal, and adding to the charge as reduction proceeds.

10. The process of effecting reduction, which consists in partially submerging a substantial portion of the charge in a molten resistor, directly heating the unsubmerged portion by products of combustion from an external source, heating the submerged portion by passing an electric current of increasing energy-density through said resistor, removing the excess slag and reduced metal, and adding to the charge as reduction proceeds.

11. The process of effecting reduction, which consists in heating one portion of the charge by combustion and another substantial portion by an electric current, and supplying more combustion-heat in proximity to the electrically-heated zone and more electric-heat remote from the combustion-heated zone.

12. The process of effecting reduction, which consists in progressively heating the charge by passing a hot gas-current from an external source away from the zone of reduction through one portion of the charge, and passing an electric current of energy-density increasing toward the zone of reduction through another substantial portion of the charge.

13. The process of effecting reduction, which consists in progressively heating the charge by passing a hot gas-current away from the zone of reduction through one portion of the charge, submerging another substantial portion of the charge in a molten resistor, and passing through said resistor an electric current of energy-density increasing toward the zone of reduction.

14. The process of heating a molten resistor, which consists in passing an electric current non-horizontally through the resistor between terminals of molten metal in contact with the resistor at different heights.

15. The process of heating a stationary molten vertical resistor-column, which consists in passing an electric current through said resistor between an upper terminal surrounding and in contact with said column and a lower terminal beneath said column.

16. The process of heating a molten vertical resistor-column, which consists in passing an electric current through said resistor between an upper terminal surrounding said column and a lower terminal beneath said column, said terminals being of molten metal.

17. The process of effecting reduction, which consists in supporting the charge in a molten vertical resistor-column, and passing an electric current through said resistor between molten terminals at its upper and lower ends.

18. The process of producing ferrosilicon, which consists in submerging a charge containing a silicon compound, a source of iron, and a reducing agent in a silicate slag resistor, and passing an electric current through said resistor.

19. The process of producing a ferrosilicon alloy, which consists in preheating a charge containing a silicon compound, a source of iron, and coal, by burning a portion of said coal, submerging the preheated charge in a silicate slag resistor, and passing an electric current through said resistor.

20. The process of producing a ferrosilicon alloy, which consists in preheating a charge containing a silicon compound, a source of iron, and coal, by burning a portion of said coal, submerging the preheated charge in a silicate slag resistor, passing an electric current through said resistor, allowing the alloy to settle, and removing the excess slag and metal and adding to the charge as reduction proceeds.

In testimony whereof, I affix my signature in presence of two witnesses.

EUGENE A. BYRNES.

Witnesses:
CLINTON P. TOWNSEND,
CHARLES H. POTTER.

Copies of this patent may be obtained for five cents each, by addressing the "Commissioner of Patents, Washington, D. C."

---

Correction in Letters Patent No 1,051,194.

It is hereby certified that in Letters Patent No. 1,051,194, granted January 21, 1913, upon the application of Eugene A. Byrnes, of Washington, District of Columbia, for an improvement in "Processes of Effecting Reduction and Producing Ferrosilicon," an error appears in the printed specification requiring correction as follows: Page 2, line 69, after the word "in" insert the word *directly;* and that the said Letters Patent should be read with this correction therein that the same may conform to the record of the case in the Patent Office.

Signed and sealed this 20th day of April, A. D., 1915.

[SEAL.]

J. T. NEWTON,
*Acting Commissioner of Patents.*

20. The process of producing a ferrosilicon alloy, which consists in preheating a charge containing a silicon compound, a source of iron, and coal, by burning a portion of said coal, submerging the preheated charge in a silicate slag resistor, passing an electric current through said resistor, allowing the alloy to settle, and removing the excess slag and metal and adding to the charge as reduction proceeds.

In testimony whereof, I affix my signature in presence of two witnesses.

EUGENE A. BYRNES.

Witnesses:
CLINTON P. TOWNSEND,
CHARLES H. POTTER.

Copies of this patent may be obtained for five cents each, by addressing the "Commissioner of Patents, Washington, D. C."

---

Correction in Letters Patent No 1,051,194.

It is hereby certified that in Letters Patent No. 1,051,194, granted January 21, 1913, upon the application of Eugene A. Byrnes, of Washington, District of Columbia, for an improvement in "Processes of Effecting Reduction and Producing Ferrosilicon," an error appears in the printed specification requiring correction as follows: Page 2, line 69, after the word "in" insert the word *directly;* and that the said Letters Patent should be read with this correction therein that the same may conform to the record of the case in the Patent Office.

Signed and sealed this 20th day of April, A. D., 1915.

[SEAL.]

J. T. NEWTON,
*Acting Commissioner of Patents.*

Correction in Letters Patent No 1,051,194.

It is hereby certified that in Letters Patent No. 1,051,194, granted January 21, 1913, upon the application of Eugene A. Byrnes, of Washington, District of Columbia, for an improvement in "Processes of Effecting Reduction and Producing Ferrosilicon," an error appears in the printed specification requiring correction as follows: Page 2, line 69, after the word "in" insert the word *directly;* and that the said Letters Patent should be read with this correction therein that the same may conform to the record of the case in the Patent Office.

Signed and sealed this 20th day of April, A. D., 1915.

[SEAL.]

J. T. NEWTON,
*Acting Commissioner of Patents.*